US 8,103,831 B2

(12) United States Patent
Rappoport et al.

(10) Patent No.: US 8,103,831 B2
(45) Date of Patent: Jan. 24, 2012

(54) EFFICIENT METHOD AND APPARATUS FOR EMPLOYING A MICRO-OP CACHE IN A PROCESSOR

(75) Inventors: Lihu Rappoport, Haifa (IL); Bob Valentine, Qiryat Tivon (IL); Stephan Jourdan, Portland, OR (US); Yoav Almog, Barcelona (ES); Franck Sala, Haifa (IL); Amir Leibovitz, Biniamina (IL); Ido Ouziel, Haifa (IL); Ron Gabor, Raanana (IL)

(73) Assignee: Intel Corporation, Santa Clara, CA (US)

( * ) Notice: Subject to any disclaimer, the term of this patent is extended or adjusted under 35 U.S.C. 154(b) by 752 days.

(21) Appl. No.: 12/060,239

(22) Filed: Mar. 31, 2008

(65) Prior Publication Data

US 2009/0249036 A1 Oct. 1, 2009

(51) Int. Cl.
*G06F 12/00* (2006.01)
(52) U.S. Cl. .................................. 711/125; 711/E12.02
(58) Field of Classification Search ......................... None
See application file for complete search history.

(56) References Cited

U.S. PATENT DOCUMENTS

2003/0009620 A1* 1/2003 Solomon et al. ............... 711/118
2003/0056066 A1* 3/2003 Chaudhry et al. ............. 711/154

* cited by examiner

*Primary Examiner* — Pierre-Michel Bataille
*Assistant Examiner* — John P Fishburn
(74) *Attorney, Agent, or Firm* — Trop, Pruner & Hu, P.C.

(57) ABSTRACT

Methods and apparatus for using micro-op caches in processors are disclosed. A tag match for an instruction pointer retrieves a set of micro-op cache line access tuples having matching tags. The set is stored in a match queue. Line access tuples from the match queue are used to access cache lines in a micro-op cache data array to supply a micro-op queue. On a micro-op cache miss, a macroinstruction translation engine (MITE) decodes macroinstructions to supply the micro-op queue. Instruction pointers are stored in a miss queue for fetching macroinstructions from the MITE. The MITE may be disabled to conserve power when the miss queue is empty-likewise for the micro-op cache data array when the match queue is empty. Synchronization flags in the last micro-op from the micro-op cache on a subsequent micro-op cache miss indicate where micro-ops from the MITE merge with micro-ops from the micro-op cache.

20 Claims, 6 Drawing Sheets

EFFICIENT METHOD AND APPARATUS FOR EMPLOYING A MICRO-OP CACHE IN A PROCESSOR

FIELD OF THE DISCLOSURE

This disclosure relates generally to the field of microprocessors. In particular, the disclosure relates to novel techniques in employing a micro-op cache for efficiently processing instructions and conserving power in a processor.

BACKGROUND OF THE DISCLOSURE

In some modern processors, instructions have variable lengths and form a complex instruction set capable of complex tasks that may involve multiple simpler tasks, thus the term complex instruction set computers (CISC). Micro-operations, also known as a micro-ops or uops, are simpler internal instructions that can be produced by decoding the more complex instructions, also referred to as macroinstructions. For high performance processors that use these variable length instructions, the decoding process can be costly in terms of circuitry, power consumption and time.

Some processors try to alleviate one or more of these costs through saving or caching the decoded micro-ops to reuse them if execution of their corresponding macroinstructions is repeated.

One technique is called a trace cache, where sequences of micro-ops are strung together and stored together with address information from their corresponding macro-instructions. Trace caches can be costly in terms of circuit complexity and size, but they save cycles of decoding time and increase performance.

Another technique is called a micro-op cache or microcode cache, where micro-ops are stored in cache lines (or ways) and tags associated with instruction pointers are used to lookup the micro-ops directly rather than decoding the corresponding macro-instruction each time. Some such micro-op caches are discussed, for example, in U.S. Pat. No. 6,950,903. Micro-op caches may be less costly than trace caches in circuit complexity and size, and more power efficient than fetching and decoding macro-instructions. Since the steps involved in decoding the variable length macroinstructions may be avoided, micro-op caches can potentially increase processor performance, but synchronization between sequences of decoded macro-instructions and cached micro-ops can be complicated and may degrade those performance increases.

To date, the range of effective techniques for employing saved or cached micro-ops to improve processing of instructions and reduce costs in terms of circuit complexity and power consumption in a processor have not been fully explored.

BRIEF DESCRIPTION OF THE DRAWINGS

The present invention is illustrated by way of example and not limitation in the figures of the accompanying drawings.

DETAILED DESCRIPTION

Figure 1:
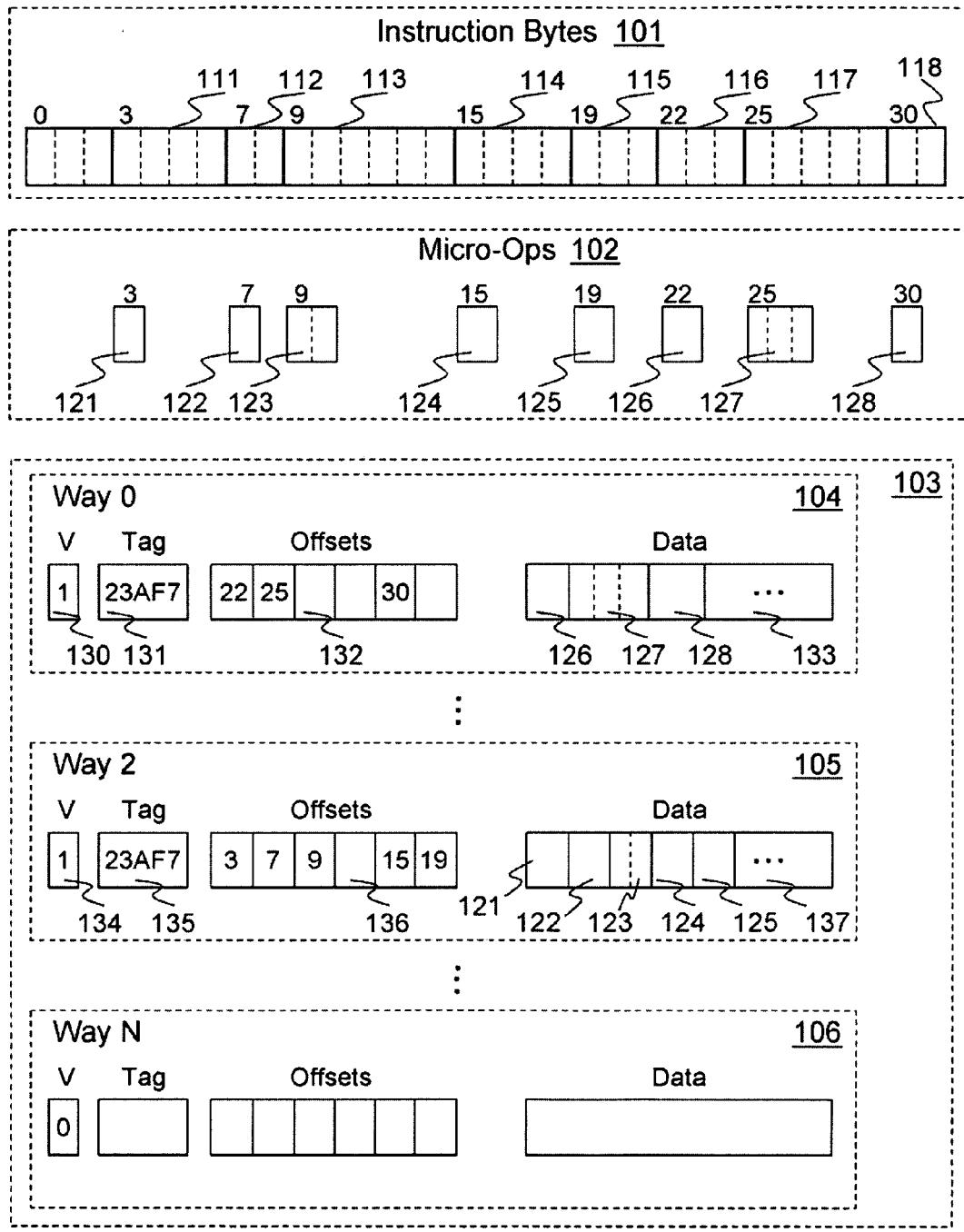
FIG. 1 illustrates one embodiment of a structure for coordinating instructions with corresponding micro-ops in a micro-op cache using sets of micro-op cache line access tuples.

Methods and apparatus for using a micro-op cache in a processor are disclosed herein. Some embodiments perform a tag match for an instruction pointer to retrieve a set of micro-op cache line access tuples, all of the line access tuples of the set having matching tags. The retrieved set of micro-op cache line access tuples is stored in a match queue. In some alternative embodiments multiple line access tuples from the match queue can be used to concurrently access multiple cache lines in a micro-op cache data array to retrieve sufficient micro-ops to supply a micro-op queue.

When there is a micro-op cache miss, a macroinstruction translation engine may be used for fetching and decoding macroinstructions to supply the micro-op queue. Instruction pointers may be stored in a miss queue to be used by the macroinstruction translation engine for fetching macroinstructions following a micro-op cache miss. In some embodiments portions of the macroinstruction translation engine may be disabled to conserve power when there are no entries in the miss queue. Likewise, the micro-op cache data array may be disabled to conserve power when there are no entries in the match queue.

In some alternative embodiments a synchronization flag may be set in the last micro-op retrieved from the micro-op cache data array responsive to a subsequent micro-op cache miss to indicate where micro-ops from the macroinstruction translation engine are to be merged with micro-ops retrieved from the micro-op cache data array, to supply the micro-op queue. Similarly, a synchronization flag may also be set in the last micro-op from the macroinstruction translation engine in response to a subsequent micro-op cache hit.

In some embodiments portions of a set of micro-op cache line access tuples may be stored in a pending fill request queue responsive to a micro-op cache miss. Then after the decoding of macroinstructions in the macroinstruction translation engine to produce micro-ops, the micro-ops and other portions of the set of micro-op cache line access tuples may be stored in a fill buffer to be combined with the portions of the set in the pending fill request queue to fill a set of micro-op cache line access tuples and their corresponding micro-op cache lines in the micro-op cache.

It will be appreciated that when the size of the retrieved set of micro-op cache line access tuples stored in a match queue is sufficiently large to oversupply the line access tuples to the micro-op cache data array then latency for switching to the macroinstruction translation engine in the event of a micro-op cache miss may be covered. It will also be appreciated that since micro-op cache hits and micro-op cache misses are mutually exclusive, either the macroinstruction translation engine or the micro-op cache data array may be disabled for a substantial portion of time to conserve power. Thus, such techniques may be useful to improve processing of instructions and reduce costs at least in terms of power consumption in a processor. As further described below implementation details of some techniques may also help to reduce costs in terms of circuit complexity.

These and other embodiments of the present invention may be realized in accordance with the following teachings and it should be evident that various modifications and changes may be made in the following teachings without departing from the broader spirit and scope of the invention. The specification and drawings are, accordingly, to be regarded in an illustrative rather than a restrictive sense and the invention measured only in terms of the claims and their equivalents.

FIG. 1 illustrates one embodiment of an exemplary structure for coordinating instructions with corresponding micro-ops in a micro-op cache using sets of micro-op cache line access tuples. Instruction bytes 101 correspond to a particular window of addressable memory locations and may be chosen to include any fixed number of bytes. For example instruction bytes 101 could correspond to a 32-byte window of addressable memory locations or instruction pointers. An example of instruction bytes 101 includes sequential macroinstructions 111-118; the first full instruction 111 starting at the third byte position of instruction bytes 101, the next instruction 112 starting at the seventh byte position, instruction 113 starting at the ninth byte position, instruction 114 starting at the fifteenth byte position, instruction 115 starting at the nineteenth byte position, instruction 116 starting at the twenty-second byte position, instruction 117 starting at the twenty-fifth byte position, and instruction 118 starting at the thirtieth byte position.

Micro-ops 102 illustrate a set of micro-ops generated by decoding macroinstructions found within the window of instruction bytes 101. An example of micro-ops 102 includes: micro-op 121, corresponding to instruction 111 and so, with respect to the window of instruction bytes 101, having a byte position offset of 3; micro-op 122, corresponding to instruction 112 and so having a byte position offset of 7; two micro-ops 123, corresponding to instruction 113 and so having a byte position offset of 9; micro-op 124, corresponding to instruction 114 and so having a byte position offset of 15; micro-op 125, corresponding to instruction 115 and so having a byte position offset of 19, micro-op 126, corresponding to instruction 116 and so having a byte position offset of 22; three micro-ops 127, corresponding to instruction 117 and so having a byte position offset of 25; and micro-op 128, corresponding to instruction 118, and so having a byte position offset of 30.

In one embodiment of micro-op cache structure 103 micro-op cache lines are organized by sets and ways. For example, micro-op cache line 104 has way 0, micro-op cache line 105 has way 2, and micro-op cache line 106 has way N. For the purpose of this disclosure, a set of lines or ways may include multiple lines or ways, all lines or ways in the set having the same tag. It will be appreciated that multiple sets, as the term is being used in this disclosure, could occupy a larger fixed-sized set of ways in the micro-op cache, but these design decisions may be made by those skilled in the art without departing from the principles of the present invention. Thus the sets, as the term is presently being used, correspond to the lines having matching tags. Multiple ways may be picked to store sequential micro-ops 102 for a set corresponding to a window of instruction bytes 101 in such a manner as to facilitate a simple sorting algorithm for sequentially sorting ways within a set to maintain the sequential order of micro-ops 102. Alternatively, since the ways in a set correspond to a single window of instruction bytes 101, the ways of a set may be sorted according to their smallest offsets.

It will be appreciated that since no instruction in the window of instruction bytes 101 can be smaller than one byte, permitting a set to have up to four ways, each way containing up to eight micro-ops would be sufficient to hold most combinations of decoded macroinstructions. In some embodiments practical observations may lead to reductions or to increases in the number of ways per set and/or the number of micro-ops per way. The number of ways per set may be reduced to three or to two in some embodiments, for example, to make sorting ways simpler and faster. The number of micro-ops per way may be reduced to six or to four in some embodiments, for example, to conserve unused micro-op storage within ways and/or to more closely match the number of micro-ops supported by a micro-op queue. Results of such decisions based on practical observations may or may not have a significant impact on micro-op cache hit or miss rates.

In some embodiments of micro-op cache structure 103, tag matching for instruction pointers may be decoupled from accessing micro-op cache lines in a data array through a queue to store micro-op cache line access tuples. A micro-op cache line access tuple, for example for cache line 104, may include a way 0, a valid bit 130, a tag 131 and offsets 132. To access micro-ops corresponding to the macroinstruction 117, for example, a tag match for the instruction pointer produces a set of micro-op cache line access tuples, including the line access tuples for cache lines 104 and 105 since they have matching tags 131 and 135. The line access tuple in the set having an offset of 25, corresponding to the byte position of the instruction pointer for macroinstruction 117 with respect to the window of instruction bytes 101, may be used to access the three micro-ops starting in the second storage position of way 0 in the corresponding set of cache lines in a micro-op data array. In some embodiments of micro-op cache structure 103, tags may be linear (i.e. virtual) to avoid the need for a translation lookaside buffer (TLB) in the micro-op cache.

Thus the micro-op cache structure 103 uses sets of micro-op cache line access tuples, for example the set corresponding to tags 135 and 131 having offsets 136 and 132 respectively, to coordinate instructions 111-115 and 116-118 with corresponding micro-ops 121-125 and 126-128 in a micro-op cache.

Figure 2:
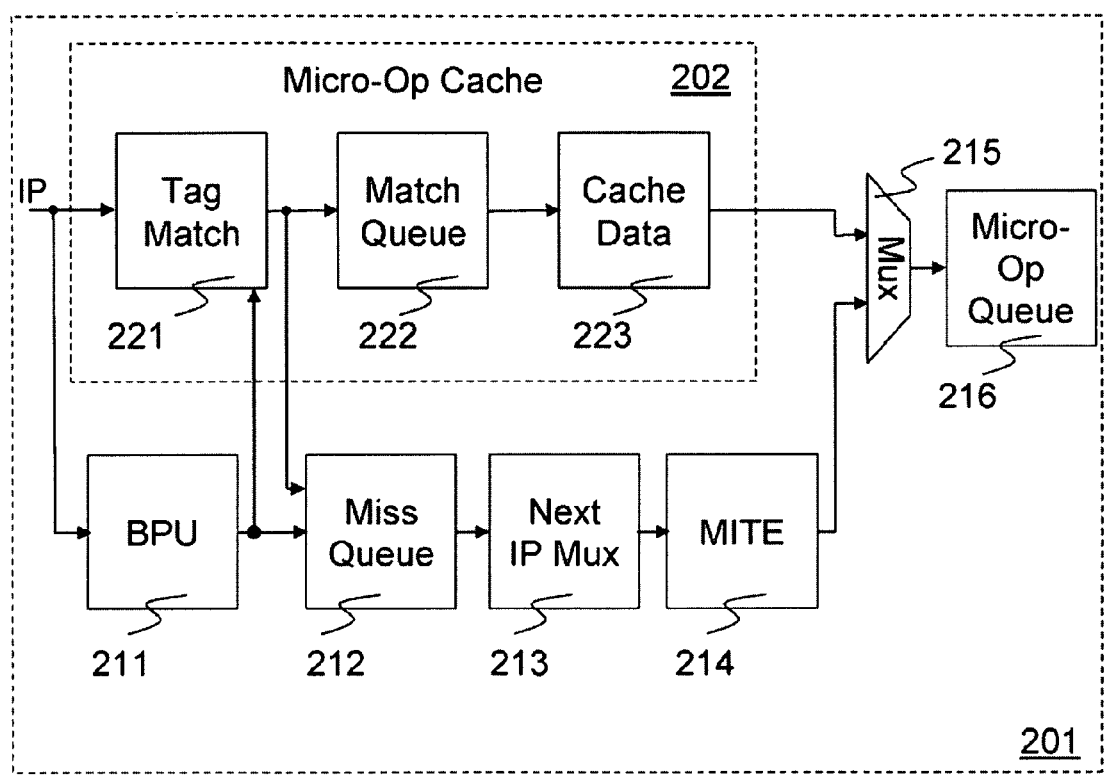
FIG. 2 illustrates one embodiment of an apparatus for employing a micro-op cache in a processor.

FIG. 2 illustrates one embodiment of an apparatus 201 for employing a micro-op cache 202 in a processor. Embodiments of apparatus 201 include tag match unit 221 to perform a tag match for an instruction pointer (IP) to retrieve a set of micro-op cache line access tuples, all of the line access tuples of the set having matching tags. In some alternative embodiments a branch prediction unit, BPU 211, may also retrieve instruction pointers. Retrieved micro-op cache line access tuples are stored in match queue 222, to be used to access cache data array 223. In some embodiments of cache data array 223, multiple line access tuples from the match queue can be used to concurrently access multiple cache lines in a micro-op cache data array 223 to retrieve sufficient micro-ops to supply micro-op queue 216.

When there is a micro-op cache 202 miss, macroinstruction translation engine, MITE 214, may be used for fetching and decoding macroinstructions to supply the micro-op queue 216. Instruction pointers from tag match unit 221 and/or BPU 211 may be stored in miss queue 212 and supplied by Next IP Mux 213 to MITE 214 for fetching macroinstructions following a micro-op cache 202 miss.

Of course since the additional number of steps for fetching and decoding macroinstructions in the MITE 214 to supply the micro-op queue 216 take longer than simply accessing micro-op cache data array 223 with cache line access tuples from match queue 222, some period of latency could be expected as a consequence of a micro-op cache 202 miss. But, it will be appreciated that when the number of micro-op cache line access tuples stored in match queue 222 at the time of a micro-op cache 202 miss is sufficiently large to oversupply line access tuples to micro-op cache data array 223, then the latency for switching to MITE 214 may be covered by a continued supply of micro-ops from the cache data array 223 to micro-op queue 216. For example, in some embodiments of micro-op cache 202, up to three micro-op cache line access tuples may be stored into match queue 222 per cycle, wherein up to two micro-op cache line access tuples may be used to concurrently access cache lines in micro-op cache data array 223. Thus match queue 222 would tend to fill up and to oversupply line access tuples to micro-op cache data array 223 thereby helping to cover the latency of a micro-op cache 202 miss.

In some embodiments of apparatus 201 portions of MITE 214 may be disabled to conserve power when there are no IP entries in the miss queue 212 and/or Next IP Mux 213. Likewise, micro-op cache data array 223 may be disabled to conserve power when there are no entries in match queue 222. It will be appreciated that since micro-op cache 202 hits and cache 202 misses are mutually exclusive, either the macroinstruction translation engine or the micro-op cache data array may be disabled for a substantial portion of time to conserve power. Thus, such techniques may be useful to improve processing of instructions and reduce costs at least in terms of power consumption in a processor. Of course in some embodiments of apparatus 201 there will be overlap, for example to cover the latency of MITE 214 or because MITE 214 may not access as large of a window of instruction bytes as tag match 221, but since MITE 214 may in general consume more power than micro-op cache data array 223, a reasonable micro-op cache hit rate would provide that MITE 214 could be disabled to conserve power for a significant portion of time when there are no entries in miss queue 212 and/or Next IP Mux 213.

In some alternative embodiments of apparatus 201 a synchronization flag may be set in the last micro-op retrieved from the micro-op cache data array 223 resulting from one or more micro-op cache 202 hits in response to the first subsequent micro-op cache 202 miss to indicate to Mux 215 where micro-ops from MITE 214 are to be merged with micro-ops retrieved from the micro-op cache data array 223 to be supplied to micro-op queue 216. Similarly, a synchronization flag may also be set in the last micro-op from MITE 214 resulting from one or more micro-op cache 202 misses in response to the first subsequent micro-op cache 202 hit. Therefore, the task of merging and synchronizing micro-op flows from micro-op cache 202 and from MITE 214 in Mux 215 may be substantially simplified, and it will be appreciated that details of such techniques may help to reduce costs in terms of circuit complexity.

Figure 3:
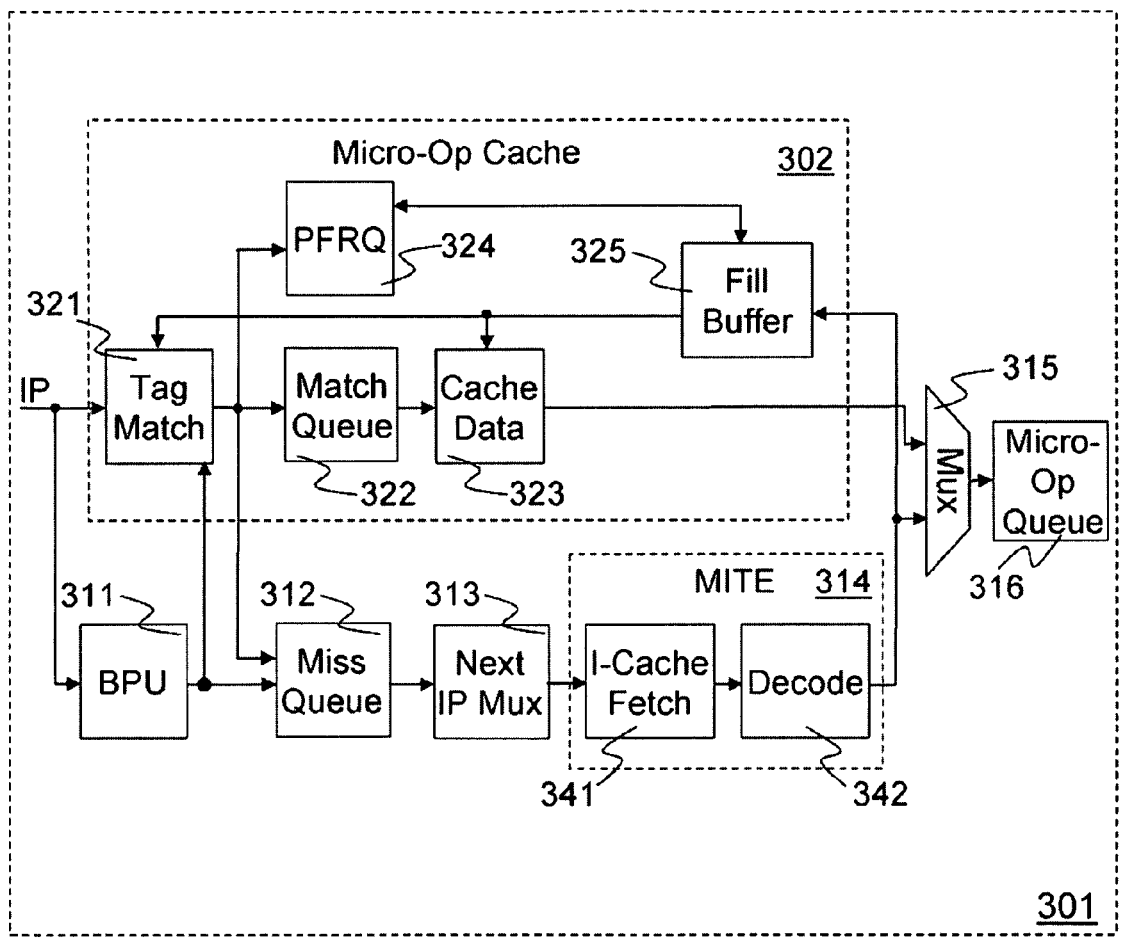
FIG. 3 illustrates an alternative embodiment of an apparatus for employing a micro-op cache in a processor.

FIG. 3 illustrates an alternative embodiment of an apparatus 301 for employing a micro-op cache 302 in a processor. Apparatus 301 includes tag match unit 321 to perform a tag match for an instruction pointer (IP) and to retrieve a set of micro-op cache line access tuples having matching tags. In some alternative embodiments branch prediction unit, BPU 311, may also retrieve instruction pointers for tag match unit 321. Retrieved micro-op cache line access tuples are stored in match queue 322, to be used to access cache data array 323. In some embodiments of cache data array 323, multiple line access tuples from match queue 322 can be used to concurrently access multiple cache lines in micro-op cache data array 323 to retrieve sufficient micro-ops to supply micro-op queue 316. For example, if a branch is taken by a micro-op in one set of line access tuples, the line access tuple for the branch target address may be used to concurrently access micro-ops from the line in the micro-op cache data array 323 corresponding to the branch target address to retrieve sufficient additional micro-ops to supply micro-op queue 316. Thus the micro-op cache data array 323 may provide a sustained bandwidth of micro-ops to supply micro-op queue 316 even in the presence of taken branches.

When there is a micro-op cache 302 miss, macroinstruction translation engine, MITE 314, may be used for fetching macroinstructions in I-cache fetch unit 341 and decoding macroinstructions in decode unit 342 to supply the micro-op queue 316. Instruction pointers from tag match unit 321 and/or BPU 311 may be stored in miss queue 312 and supplied by Next IP Mux 313 to MITE 314 for fetching macroinstructions in I-cache fetch unit 341 following a micro-op cache 302 miss. In some embodiments of apparatus 301 portions of MITE 314 may be disabled to conserve power when there are no IP entries in the miss queue 312 and/or Next IP Mux 313. Likewise, micro-op cache data array 323 may be disabled to conserve power when there are no entries in match queue 322.

In some alternative embodiments of apparatus 301 a synchronization flag may be set in the last micro-op retrieved from the micro-op cache data array 323 responsive to a subsequent micro-op cache 302 miss to indicate to Mux 315 where micro-ops from decode unit 342 of MITE 314 are to be merged with micro-ops retrieved from the micro-op cache data array 323 prior to being supplied to micro-op queue 316. Similarly, a synchronization flag may be set in the last micro-op from decode unit 342 of MITE 314 in response to a subsequent micro-op cache 302 hit.

In some embodiments of micro-op cache 302 portions of a set of micro-op cache line access tuples generated by tag match unit 321 may be stored in pending fill request queue 324 responsive to a micro-op cache miss. Then after the decoding of macroinstructions in decode unit 342 of MITE 314 to produce micro-ops, those micro-ops and other portions of the set of micro-op cache line access tuples may be stored in fill buffer 325 to be combined with the portions of the set stored in pending fill request queue 324 to fill a set of micro-op cache lines in micro-op cache 302. It will be appreciated that such implementation details may help reduce cost in terms of circuit complexity. For example, use of the pending fill request queue 324 for a micro-op cache miss may make it possible to avoid an additional read port in tag match unit 321 for handling micro-op cache line fills.

By oversupplying line access tuples to the micro-op cache data array 323 some latency for switching to the macroinstruction translation engine, MITE 314, may be covered. Thus, such techniques may be useful to improve processing of instructions and reduce costs in terms of power consumption and circuit complexity in a processor.

Figure 4A:
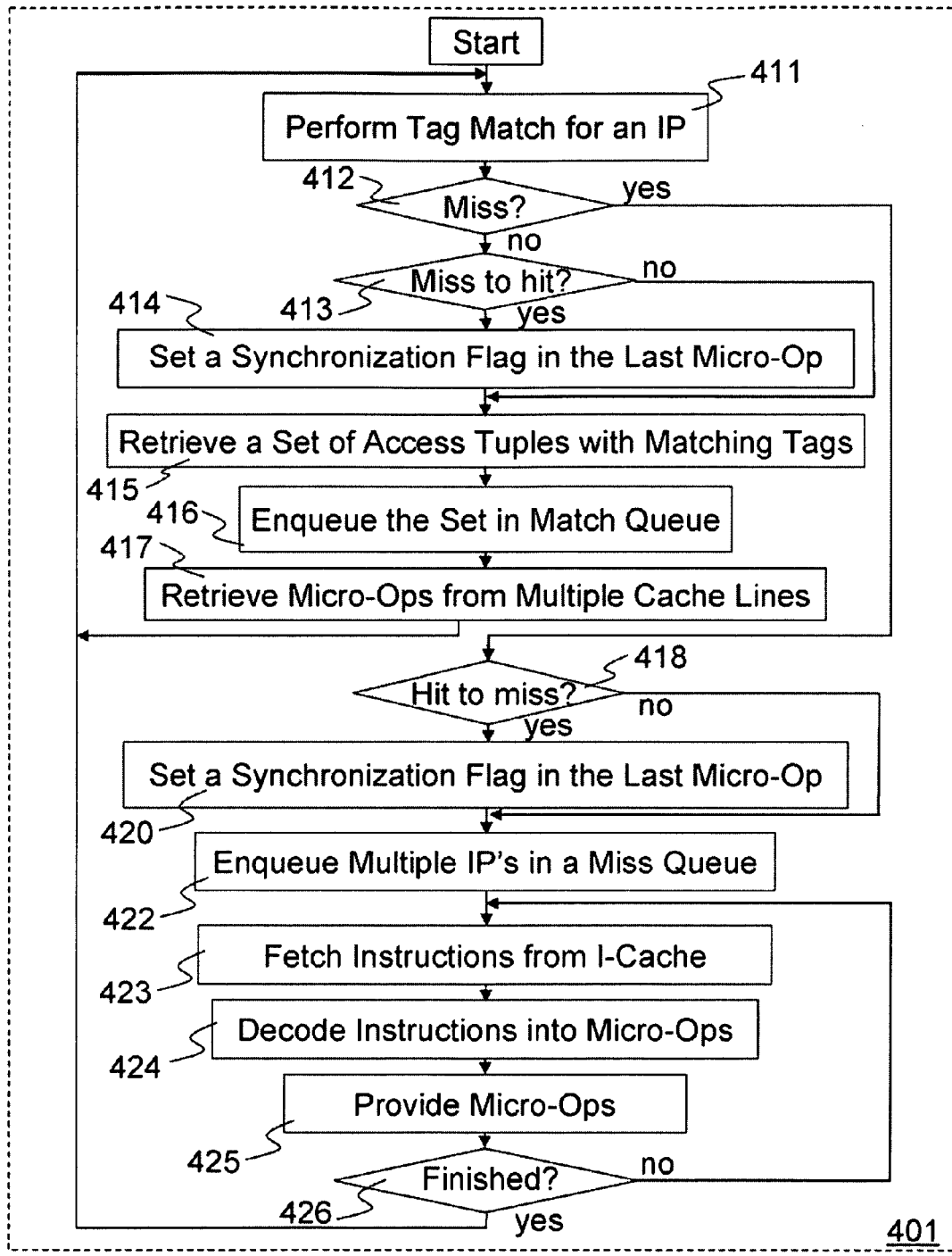
FIG. 4a illustrates a flow diagram for one embodiment of a process to use a micro-op cache in a processor.

FIG. 4 illustrates a flow diagram for one embodiment of a process 401 to use a micro-op cache in a processor. Process 401 and other processes herein disclosed are performed by processing blocks that may comprise dedicated hardware or software or firmware operation codes executable by general purpose machines or by special purpose machines or by a combination of both.

In processing block 411 a tag match for an instruction pointer is performed. If a micro-op cache miss is detected in processing block 412 then processing proceeds to processing block 418. Otherwise processing continues in processing block 413 where it is determined if the micro-op cache hit is the first hit following one or more misses, in which case in processing block 414 a synchronization flag is set in the last micro-op from the macroinstruction translation engine preceding the micro-op cache hit. If it is determined if the micro-op cache hit is not the first hit following one or more misses, the processing skips directly to processing block 415 where a set of micro-op cache line access tuples having matching tags is retrieved. Then in processing block 416 the set of micro-op cache line access tuples is stored or enqueued in a match queue. In processing block 417 micro-op cache line access tuples from the match queue are used to concurrently access multiple cache lines in a micro-op cache data array to retrieve micro-ops, which may then be supplied to a micro-op queue. Processing then repeats in processing block 411.

Now if a micro-op cache miss is detected in processing block 412 then processing would proceed to processing block 418 where it is determined if the micro-op cache miss is the first miss following one or more hits, in which case in processing block 420 a synchronization flag is set in the last micro-op retrieved from the micro-op cache data array preceding the miss. If it is determined if the micro-op cache miss is not the first miss following one or more hits, the processing skips directly to processing block 422 where multiple instruction pointers are stored or enqueued in a miss queue responsive to the micro-op cache miss. Now starting in processing block 423 an instruction cache is accessed using instruction pointers from the miss queue to fetch or retrieve instructions. In processing block 424 instructions are decoded to produce micro-ops to supply a micro-op queue. The micro-ops are also provided in processing block 425 to fill a set in the micro-op cache. In processing block 426, if processing instruction pointers enqueued in processing block 422 in the miss queue is not finished processing repeats starting in processing block 423. Otherwise processing returns to processing block 411.

It will be appreciated that while certain processing blocks of process 401 and other processes herein disclosed may be performed by different individual units and/or in different pipelines of apparatus 201 of or apparatus 301, many of the processing blocks of process 401 and other processes herein disclosed may, in practice, be performed concurrently.

Figure 4B:
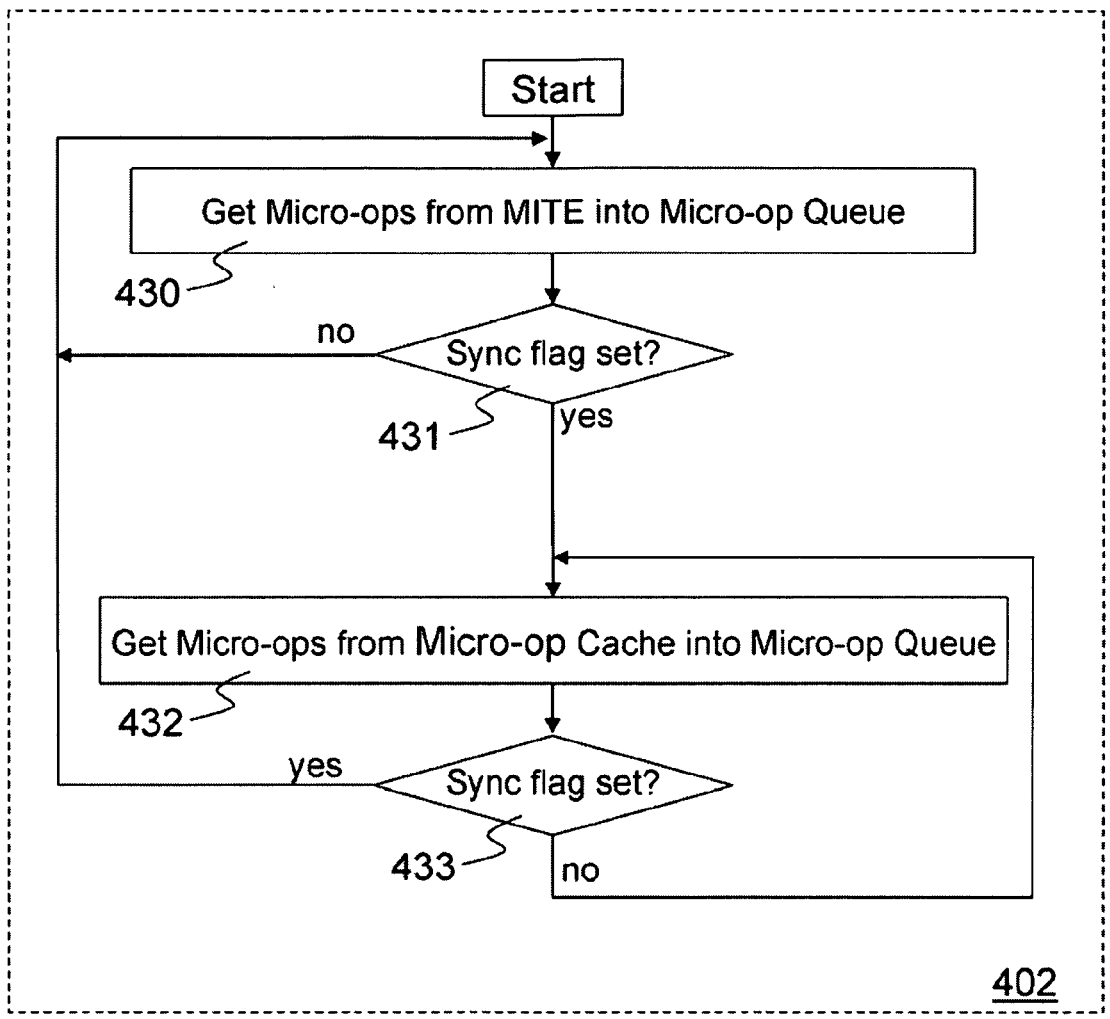
FIG. 4b illustrates a flow diagram for one embodiment of a process to synchronize micro-op flows from a micro-op cache and from a macroinstruction translation engine in a processor.

FIG. 4b illustrates a flow diagram for one embodiment of a process 402 to synchronize micro-op flows coming from a micro-op cache and from a macroinstruction translation engine in a processor. In processing block 430 micro-ops are retrieved from the macroinstruction translation engine and delivered into the micro-op queue in sequential groups. In processing block 431 it is determined if the synchronization flag was set in the last micro-op retrieved from the macroinstruction translation engine. If not processing repeats in processing block 430. Otherwise processing proceeds to processing block 432 where micro-ops are retrieved from the micro-op cache and delivered into the micro-op queue in sequential groups. In processing block 433 it is determined if the synchronization flag was set in the last micro-op retrieved from the micro-op cache. If not processing repeats in processing block 432. Otherwise processing returns to processing block 430. Thus the mux 215 or mux 315 may provide the synchronized sequential micro-op flows coming from the micro-op cache and from the macroinstruction translation engine into the micro-op queue.

Figure 5:
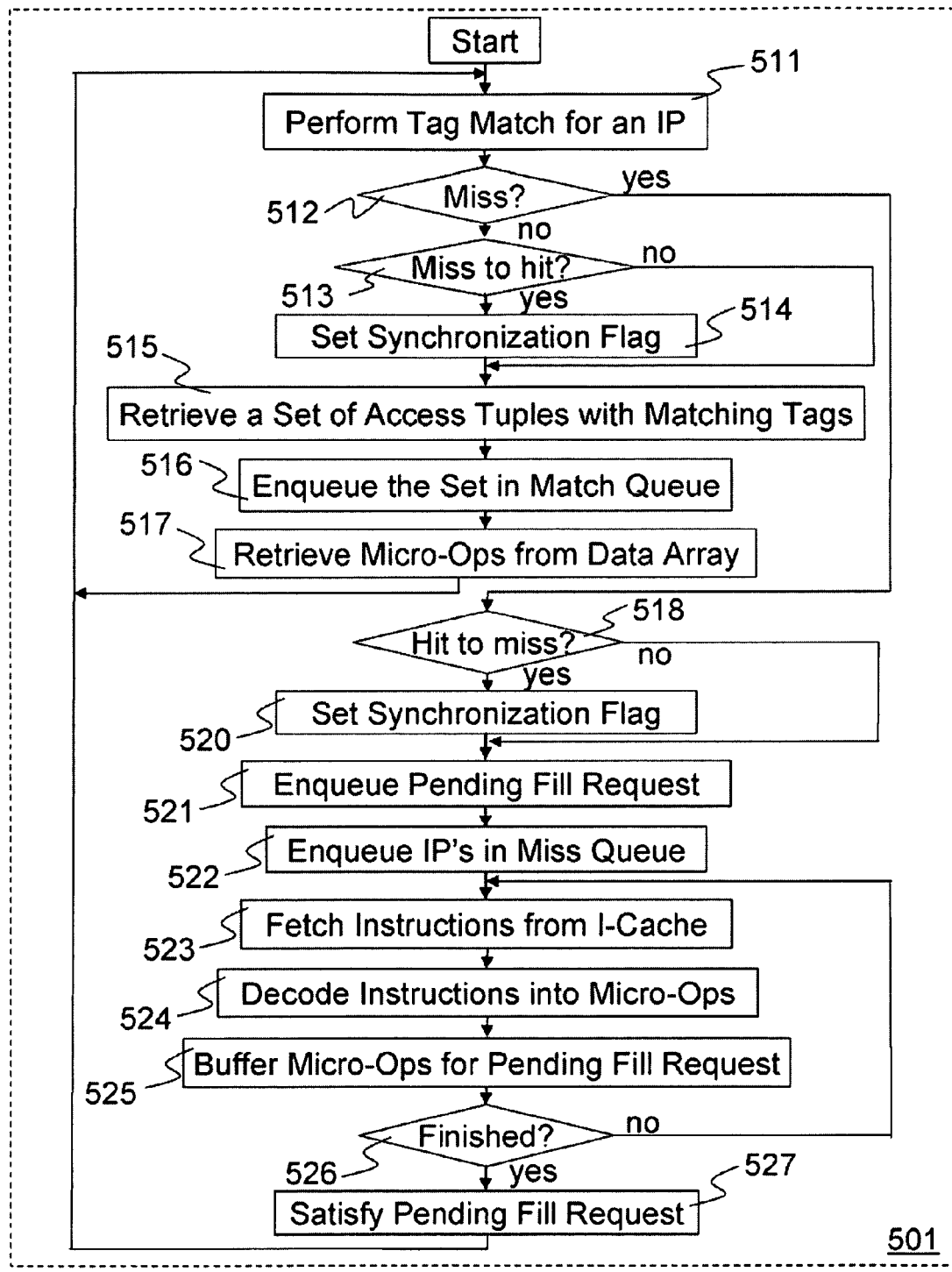
FIG. 5 illustrates a flow diagram for an alternative embodiment of a process to use a micro-op cache in a processor.

FIG. 5 illustrates a flow diagram for an alternative embodiment of a process 501 to use a micro-op cache in a processor. In processing block 511 a tag match for an instruction pointer is performed. If a micro-op cache miss is detected in processing block 512 then processing proceeds to processing block 518. Otherwise processing continues in processing block 513 where it is determined if the micro-op cache hit is the first hit following one or more misses, in which case in processing block 514 a synchronization flag is set in the last micro-op from the macroinstruction translation engine preceding the micro-op cache hit. If it is determined if the micro-op cache hit is not the first hit following one or more misses, the processing skips directly to processing block 515 where a set of micro-op cache line access tuples having matching tags is retrieved. Then in processing block 516 the set of micro-op cache line access tuples is stored or enqueued in a match queue. In processing block 517 micro-op cache line access tuples from the match queue are used to access a micro-op cache data array to retrieve micro-ops, which may be supplied to a micro-op queue. Processing then repeats in processing block 511.

Now if a micro-op cache miss is detected in processing block 512 then processing would proceed to processing block 518 where it is determined if the micro-op cache miss is the first miss following one or more hits, in which case in processing block 520 a synchronization flag is set in the last micro-op retrieved from the micro-op cache data array preceding the miss. If it is determined if the micro-op cache miss is not the first miss following one or more hits, the processing skips directly to processing block 521 where portions of a set of micro-op cache line access tuples are stored or enqueued in a pending fill request queue for the micro-op cache miss. In processing block 522 multiple instruction pointers are stored or enqueued in a miss queue for processing the micro-op cache miss. Now starting in processing block 523 an instruction cache is accessed to fetch instructions using instruction pointers from the miss queue. In processing block 524 instructions are decoded to produce micro-ops to supply a micro-op queue. The micro-ops are also provided in processing block 525 to a fill buffer along with other portions of a corresponding set of micro-op cache line access tuples from processing block 524 to fill a set in the micro-op cache. In processing block 526, if processing instruction pointers enqueued in processing block 522 in the miss queue is not finished, processing repeats starting in processing block 523. Otherwise processing proceeds to processing block 528 where micro-ops from the fill buffer and a combination of the portions of micro-op cache line access tuples having matching tags from the fill buffer and from the pending fill request queue are used to satisfy the pending fill request in the micro-op cache. Processing then returns to processing block 511.

It will be appreciated from the above description that process 501 and other processes described herein may provide effective techniques for employing cached micro-ops to improve processing performance of instructions and reduce costs in terms of circuit complexity and power consumption in a processor.

The above description is intended to illustrate preferred embodiments of the present invention. From the discussion above it should also be apparent that especially in such an area of technology, where growth is fast and further advancements are not easily foreseen, the invention can may be modified in arrangement and detail by those skilled in the art without departing from the principles of the present invention within the scope of the accompanying claims and their equivalents.

What is claimed is:

1. A method for using a micro-op cache in a processor, the method comprising:
    performing a tag match in a tag match unit of the micro-op cache for an instruction pointer received in the tag match unit to retrieve a first set of micro-op cache line access tuples having matching tags, each of the first set of micro-op cache line access tuples having a tag and an offset;
    storing the first set of micro-op cache line access tuples in a match queue to store up to N micro-op cache line access tuples per cycle, wherein N is greater than 1; and
    concurrently accessing a first plurality of cache lines in a micro-op cache data array responsive to the first set of micro-op cache line access tuples from the match queue to retrieve a second plurality of micro-ops from the micro-op cache data array.

2. The method of claim 1 further comprising:
setting a synchronization flag in a last micro-op from the second plurality of micro-ops retrieved from the micro-op cache data array responsive to a micro-op cache miss to indicate to a multiplexer where to merge the second plurality of micro-ops from the micro-cop cache data array with micro-ops from a translation engine.

3. The method of claim 2 further comprising:
storing a first portion of a second set of micro-op cache line access tuples in a pending fill request queue responsive to the micro-op cache miss.

4. The method of claim 3 further comprising:
storing a plurality of instruction pointers in a miss queue responsive to the micro-op cache miss.

5. The method of claim 4 further comprising:
accessing an instruction cache using the plurality of instruction pointers from the miss queue to retrieve a plurality of instructions;
decoding the plurality of instructions to produce a third plurality of micro-ops and a second portion of the second set of micro-op cache line access tuples; and
storing the third plurality of micro-ops and a combination of the first and the second portions of the second set of micro-op cache line access tuples in the micro-op cache, the second set of micro-op cache line access tuples having matching tags.

6. The method of claim 5 further comprising:
setting a synchronization flag in a last micro-op from the third plurality of micro-ops retrieved from the micro-op cache data array responsive to a subsequent micro-op cache hit.

7. An apparatus comprising:
a micro-op cache having dedicated hardware comprising:
a tag match unit to perform a tag match for an instruction pointer received in the tag match unit and to retrieve a first set of micro-op cache line access tuples having matching tags, each of the first set of micro-op cache line access tuples having a tag and an offset;
a match queue operatively coupled with the tag match unit to store the first set of micro-op cache line access tuples to store up to N micro-op cache line access tuples per cycle, wherein N is greater than 1; and
a micro-op cache data array operatively coupled with the match queue to provide concurrent access to a first plurality of cache lines, the micro-op cache data array to retrieve a second plurality of micro-ops from said first plurality of cache lines responsive to the first set of micro-op cache line access tuples oversupplied from the match queue.

8. The apparatus of claim 7 wherein said first set of micro-op cache line access tuples has up to at least three micro-op cache line access tuples.

9. The apparatus of claim 8 wherein each micro-op cache line access tuple of said first set of micro-op cache line access tuples can access a cache line in the micro-op cache data array storing up to at least six micro-ops.

10. The apparatus of claim 7 wherein a synchronization flag is set in a last micro-op from the second plurality of micro-ops retrieved from the micro-op cache data array responsive to a subsequent micro-op cache miss to indicate where to merge the second plurality of micro-ops from the micro-cop cache data array with micro-ops from a translation engine.

11. The apparatus of claim 7 further comprising:
a miss queue operatively coupled with the tag match unit to store a plurality of instruction pointers responsive to a micro-op cache miss;
an instruction cache to retrieve a plurality of instructions using the plurality of instruction pointers from the miss queue; and
an instruction decoder to decode the plurality of instructions and to produce a third plurality of micro-ops.

12. The apparatus of claim 7 further comprising:
a pending fill request queue operatively coupled with the tag match unit to store a first portion of a second set of micro-op cache line access tuples in response to a micro-op cache miss.

13. The apparatus of claim 12 further comprising:
an instruction cache to retrieve a plurality of instructions responsive to the micro-op cache miss;
an instruction decoder to decode the plurality of instructions and to produce a third plurality of micro-ops and a second portion of the second set of micro-op cache line access tuples; and
a fill buffer to store the third plurality of micro-ops and the second portion of the second set of micro-op cache line access tuples to be combined with the first portion of the second set of micro-op cache line access tuples from the pending fill request queue to fill a corresponding second set of micro-op cache lines in the micro-op cache, the corresponding second set of micro-op cache line access tuples having matching tags.

14. The apparatus of claim 13 wherein a synchronization flag is set in a last micro-op from the third plurality of micro-ops responsive to a subsequent micro-op cache hit.

15. An apparatus comprising:
a micro-op cache having dedicated hardware comprising:
a tag match unit to perform a tag match for an instruction pointer received in the tag match unit and to retrieve a first set of micro-op cache line access tuples having matching tags, each of the first set of micro-op cache line access tuples having a tag and an offset;
a micro-op cache data array to provide concurrent access to a first plurality of cache lines, the micro-op cache data array to retrieve a second plurality of micro-ops from said first plurality of cache lines responsive to a corresponding first plurality of micro-op cache line access tuples;
a pending fill request queue operatively coupled with the tag match unit, the pending fill request queue to store a first portion of a second set of micro-op cache line access tuples responsive to a micro-op cache miss.

16. The apparatus of claim 15 wherein a synchronization flag is set in a last micro-op from the second plurality of micro-ops retrieved from the micro-op cache data array responsive to the micro-op cache miss to indicate where to merge the second plurality of micro-ops from the micro-cop cache data array with micro-ops from a translation engine.

17. The apparatus of claim 15 further comprising:
a match queue operatively coupled with the tag match unit to store the first set of micro-op cache line access tuples for accessing the micro-op cache data array;
a miss queue operatively coupled with the tag match unit to store a plurality of instruction pointers responsive to a micro-op cache miss;
an instruction fetch stage to retrieve a plurality of instructions using the plurality of instruction pointers from the miss queue;
an instruction decode stage to decode the plurality of instructions and to produce a third plurality of micro-ops and a second portion of the second set of micro-op cache line access tuples; and
a fill buffer to store the third plurality of micro-ops and the second portion of the second set of micro-op cache line access tuples to be combined with the first portion of the second set of micro-op cache line access tuples from the pending fill request queue to fill a corresponding second set of micro-op cache lines in the micro-op cache, the corresponding second set of micro-op cache line access tuples having matching tags.

18. The apparatus of claim 17 wherein a synchronization flag is set in a last micro-op from the third plurality of micro-ops responsive to a subsequent micro-op cache hit.

19. The apparatus of claim 17 wherein the micro-op cache data array is disabled to conserve power when the match queue is empty.

20. The apparatus of claim 17 wherein the instruction fetch stage and the instruction decode stage are disabled to conserve power when the miss queue is empty.

* * * * *